(12) United States Patent
Forsyth

(10) Patent No.: US 12,305,754 B2
(45) Date of Patent: May 20, 2025

(54) CVT SPIDER CLUTCH WITH ROLLER SYSTEM

(71) Applicant: David Randolph Forsyth, Sicamous (CA)

(72) Inventor: David Randolph Forsyth, Sicamous (CA)

( * ) Notice: Subject to any disclaimer, the term of this patent is extended or adjusted under 35 U.S.C. 154(b) by 0 days.

(21) Appl. No.: 18/732,977

(22) Filed: Jun. 4, 2024

(65) Prior Publication Data

US 2024/0410449 A1 Dec. 12, 2024

Related U.S. Application Data

(63) Continuation-in-part of application No. 18/280,069, filed on Sep. 1, 2023, now Pat. No. 12,104,695.

(60) Provisional application No. 63/471,266, filed on Jun. 6, 2023.

(51) Int. Cl.
*F16H 9/18* (2006.01)
*F16H 55/56* (2006.01)

(52) U.S. Cl.
CPC ............... *F16H 9/18* (2013.01); *F16H 55/56* (2013.01)

(58) Field of Classification Search
CPC ............. F16H 55/563; F16H 61/66245; F16H 63/067; F16H 55/56; F16H 9/18; F16H 61/66227; F16H 9/125; F16H 57/0416
USPC .......................................................... 474/14
See application file for complete search history.

(56) References Cited

U.S. PATENT DOCUMENTS

| | | | | |
|---|---|---|---|---|
| 3,733,918 A | * | 5/1973 | Domaas | F16H 55/563 474/14 |
| 3,759,111 A | * | 9/1973 | Hoff | F16H 55/563 474/14 |
| 3,777,584 A | * | 12/1973 | Domaas | F16H 61/66245 474/14 |
| 3,861,229 A | * | 1/1975 | Domaas | F16H 55/563 474/14 |
| 3,916,707 A | * | 11/1975 | Wells | F16H 61/66245 474/46 |
| 3,939,720 A | * | 2/1976 | Aaen | F16H 55/563 474/46 |
| 3,951,224 A | * | 4/1976 | Beaudoin | B60K 11/06 474/93 |
| 3,958,461 A | * | 5/1976 | Aaen | F16H 55/563 474/14 |
| 3,961,539 A | * | 6/1976 | Tremblay | F16H 55/563 474/46 |

(Continued)

*Primary Examiner* — Henry Y Liu
(74) *Attorney, Agent, or Firm* — JOHNSON AND PHUNG; Thomas Phung

(57) ABSTRACT

A CVT spider assembly roller system having a spider portion main body, a plurality of main body arms extending equal distance from a sidewall of the main body with the arms each having a free end, first side, a second side, and a roller supporting orifice extending from the first side to the second side of the arm, a first bolt receiving slot extending from the free end of the arms into the roller supporting orifice and a second bolt receiving slot located on the main body and aligned with the first bolt receiving slot, a spider roller supported partially within the spider roller supporting orifice and including a moveable sheave engaging exterior rotating surface extending partially outward equal distance from each of the sides of the arm, and a shift arm supporting recess located on the sidewall equal distance between each of the arms of the main body.

18 Claims, 11 Drawing Sheets

(56) References Cited

U.S. PATENT DOCUMENTS

| | | | |
|---|---|---|---|
| 3,986,406 A * | 10/1976 | Prasad | F16H 61/66245 474/14 |
| 4,027,544 A * | 6/1977 | Kobayashi | F16H 55/563 474/14 |
| 4,051,739 A * | 10/1977 | Takagi | F16H 55/563 474/14 |
| 4,052,908 A * | 10/1977 | Takagi | F16H 55/563 474/14 |
| 4,095,479 A * | 6/1978 | Lundberg | F16H 55/563 474/14 |
| 4,313,728 A * | 2/1982 | Prasad | F16H 55/563 192/105 CD |
| 4,464,144 A * | 8/1984 | Kobayashi | F16H 55/563 474/43 |
| 4,483,686 A * | 11/1984 | Kobayashi | F16H 55/563 474/93 |
| 4,575,363 A * | 3/1986 | Burgess | F16H 55/563 474/14 |
| 4,826,467 A * | 5/1989 | Reese | F16H 55/563 474/14 |
| 5,209,703 A * | 5/1993 | Mastine | F16H 55/563 474/70 |
| 5,326,330 A * | 7/1994 | Bostelmann | F16H 55/563 474/14 |
| 5,421,784 A * | 6/1995 | Robert | F16H 55/563 474/13 |
| 5,562,555 A * | 10/1996 | Peterson | F16H 55/563 192/105 CD |
| 5,597,060 A * | 1/1997 | Huddleston | F16H 55/563 474/14 |
| 5,647,810 A * | 7/1997 | Huddleston | F16H 55/563 384/126 |
| 5,692,983 A * | 12/1997 | Bostelmann | F16H 55/563 474/14 |
| 5,797,816 A * | 8/1998 | Bostelmann | F16H 55/563 474/14 |
| 6,149,540 A * | 11/2000 | Johnson | F16H 61/66227 474/46 |
| 6,309,317 B1 * | 10/2001 | Joss | F16D 43/06 474/14 |
| 6,334,826 B1 * | 1/2002 | Takagi | F16H 55/563 474/14 |
| 6,346,056 B1 * | 2/2002 | Nouis | F16H 61/66272 474/14 |
| 8,409,039 B2 * | 4/2013 | Beyer | F16H 55/563 474/14 |
| 9,057,432 B1 * | 6/2015 | Bouffard | F16H 55/56 |
| 9,500,264 B2 * | 11/2016 | Aitcin | B62M 27/02 |
| 9,593,759 B2 * | 3/2017 | Millard | F16H 55/563 |
| 10,066,729 B2 * | 9/2018 | Aitcin | F16H 55/54 |
| 10,174,827 B2 * | 1/2019 | Eck | F16C 21/005 |
| 10,487,930 B2 * | 11/2019 | Okeson | F16H 37/0846 |
| 10,767,745 B2 * | 9/2020 | Zauner | F16H 55/563 |
| 11,306,809 B2 * | 4/2022 | Aitcin | B62M 27/02 |
| 11,624,427 B2 * | 4/2023 | Itoo | F16H 9/125 474/14 |
| 11,680,635 B2 * | 6/2023 | Olason | F16H 63/067 474/14 |
| 11,739,836 B2 * | 8/2023 | Roberts | F16H 63/067 474/14 |
| 11,835,120 B2 * | 12/2023 | Hamm | F16H 55/563 |
| 2002/0119846 A1 * | 8/2002 | Kitai | F16H 63/062 474/14 |
| 2002/0123400 A1 * | 9/2002 | Younggren | F16H 63/067 474/14 |
| 2004/0110583 A1 * | 6/2004 | Liang | F16H 55/563 474/14 |
| 2009/0227404 A1 * | 9/2009 | Beyer | F16H 55/563 474/14 |
| 2011/0092325 A1 * | 4/2011 | Vuksa | F16H 9/18 192/45.02 |
| 2012/0214626 A1 * | 8/2012 | Cook | F16H 55/563 474/14 |
| 2014/0349792 A1 * | 11/2014 | Aitcin | F16H 63/067 474/13 |
| 2015/0267792 A1 * | 9/2015 | Hochmayr | F16H 61/6624 474/14 |
| 2016/0069434 A1 * | 3/2016 | Aitcin | F16H 55/563 180/54.1 |
| 2016/0160989 A1 * | 6/2016 | Millard | F16H 55/563 474/14 |
| 2017/0030454 A1 * | 2/2017 | Aitcin | F16H 55/563 |
| 2018/0037212 A1 * | 2/2018 | Beyer | F16H 63/067 |
| 2018/0080554 A1 * | 3/2018 | Simpson | F16H 55/566 |
| 2018/0202533 A1 * | 7/2018 | Zauner | F16H 9/18 |
| 2018/0238430 A1 * | 8/2018 | Eck | F16H 55/563 |
| 2018/0363748 A1 * | 12/2018 | Okeson | F16H 61/66245 |
| 2019/0063582 A1 * | 2/2019 | Aitcin | B62M 27/02 |
| 2020/0166115 A1 * | 5/2020 | Aitcin | F16H 9/18 |

\* cited by examiner

CVT SPIDER CLUTCH WITH ROLLER SYSTEM

CROSS-REFERENCE TO RELATED APPLICATIONS

This application is a continuation-in-part application of my patent application Ser. No. 18/280,069; filed on Sep. 1, 2023; titled PRIMARY CLUTCH FOR OFF-ROAD VEHICLES and further claims priority to provisional patent application Ser. No. 63/471,266; filed on Jun. 6, 2023; titled CVT SPIDER CLUTCH WITH ROLLER SYSTEM.

FIELD OF THE INVENTION

Embodiments of the present disclosure generally relate to the field of off-road vehicle drivetrains. More specifically, embodiments of the disclosure relate to an apparatus and methods for a CVT primary clutch that provides enhanced adjustability and performance to off-road vehicle drivetrains.

STATEMENT REGARDING FEDERALLY SPONSORED RESEARCH OR DEVELOPMENT

None

REFERENCE TO A MICROFICHE APPENDIX

None

BACKGROUND OF THE INVENTION

Off-road vehicles enjoy an enthusiastic following because of their many uses and versatility. As a result, several types of motorsports involve the racing of various types of off-road vehicles. For example, competitions exist that are dedicated to various types of terrain, such as rally, desert racing, and rock-crawling. Besides their use in various motorsports, off-road vehicles commonly are used for sightseeing and traveling to areas that may not be accessed by way of standard, paved roads.

Many recreational off-road vehicles such as all-terrain vehicles (ATVs) utility vehicles, motorcycles, snowmobiles, and the like, include a continuous variable transmission (CTV). In general, a CVT is an automatic transmission that can change seamlessly through a continuous range of gear ratios, unlike conventional transmissions that provide a limited number of gear ratios in fixed steps.

One of the most common types of C T includes a V-belt connected between two variable-diameter pulleys. Each variable diameter pulley includes two cone-shaped halves or sheaves, that can be moved together and apart. Moving the two sheaves of a pulley closer together causes the V-belt to ride higher, or farther away from an axle of the pulley. As such, the effective diameter of the pulley is dependent on the distance between the two sheaves of the pulley. Further, by moving the sheaves of a first pulley closer together and the sheaves of a second pulley farther apart, the V-belt can be caused to ride higher on the first pulley and ride lower on the second pulley. Thus, a gear ratio between the first and second pulleys can be manipulated by adjusting the distance between the sheaves comprising the first and second pulleys.

Moreover, since the distance between the first and second pulleys as well as the length of the V-belt remain constant, the first and second pulleys must be adjusted simultaneously to maintain a suitable tension on the V-belt. In some cases, a simple CVT may include a centrifugal drive pulley and a spring-loaded driven pulley that uses belt tension to effect conforming adjustments in the driven pulley.

Given the popularity of off-road vehicles, there is a desire to improve the mechanical strength and performance of off-road drivetrain and suspension systems, while at the same reducing the mechanical complexity of such systems.

SUMMARY OF THE INVENTION

Briefly, the present invention comprises a CVT primary clutch spider assembly roller system that includes a spider portion main body having a first face, a second face, a side wall, and a center portion with a spider main orifice extending through the main body with the center portion configured to mount the main body onto a center post within an interior of a moveable sheave of a CVT primary clutch. Located on the first face of the main body proximal to the center portion is a circular groove configured to receive an end of a coil spring disposed between the main body and an interior surface of a face plate.

Extending equal distance from the sidewall of the main body in a direction perpendicular to a central axis of the spider main orifice of the center portion are preferably four main body arms each having a free end, first side, a second side, and a roller supporting orifice extending from the first side to the second side of the main body arm, the free end of the main body arms each having an indented ridge to provide the flush mounting of a roller mounting bolt to the main body arm. Extending from the free end of the main body arms into the roller supporting orifice is a first bolt receiving slot that is aligned with a corresponding second bolt receiving slot located on the main body.

Mounted to the roller supporting orifice by a precision machined stainless steel roller collar located between the spider roller and a roller mounting bolt is a spider roller that is supported partially within the spider roller supporting orifice with a moveable sheave engaging exterior rotating surface of the spider roller extending partially outward equal distance from each of the sides of the main body arm to provide smooth back and forth movement of the moveable sheave.

Located on the sidewall equal distance between each of the arms of the main body is a shift arm supporting recess with the shift arm supporting recess each supporting a shift arm having a roller configured to ride on a ramp coupled to a moveable sheave.

DESCRIPTION OF THE PREFERRED EMBODIMENT

Figure 1:
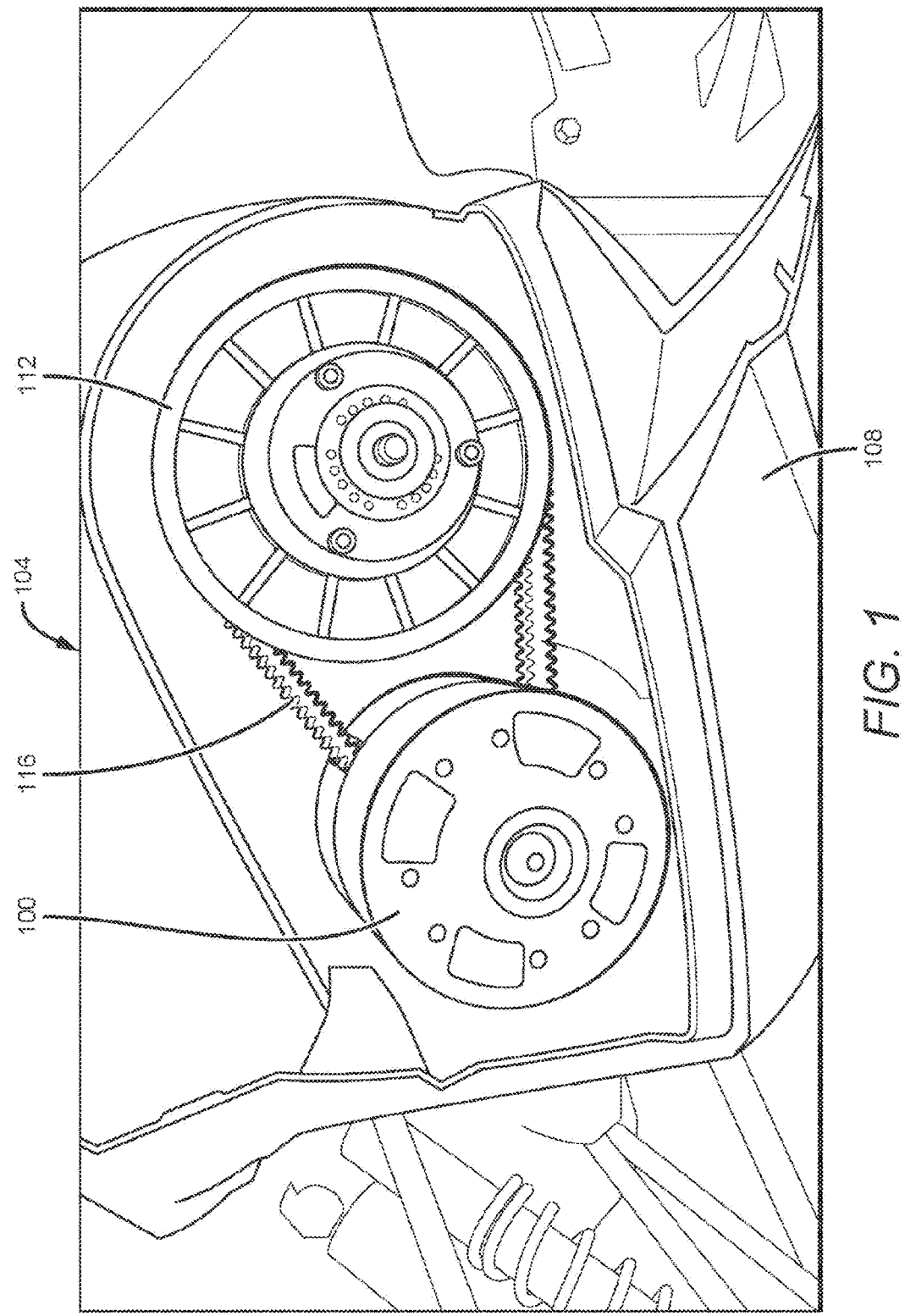
FIG. 1 illustrates an exemplary embodiment of a CVT primary clutch of the present invention.

The general purpose of the present invention, which will be described subsequently in greater detail, is to provide a spider assembly roller system of a CVT primary clutch that replaces the button system of previous spiders with a roller-based component that includes but is not limited to rollers and a collar that runs through the roller to improve performance.

There has thus been outlined the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the disclosing subject matter be regarded as including such equivalent constructions insofar as they do not depart from the spirit and scope of the present invention.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

In addition, the accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of any potential claims.

In the following description, numerous specific details are set forth in order to provide a thorough understanding of the present disclosure. It will be apparent, however, to one of ordinary skill in the art that the invention disclosed herein may be practiced without these specific details. In other instances, specific numeric references such as "first sheave." may be made. However, the specific numeric reference should not be interpreted as a literal sequential order but rather interpreted that the "first sheave" is different than a "second sheave." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

Many recreational off-road vehicles, such as all-terrain vehicles (ATV's), include a continuously variable transmission (CVT). One common type of CVT includes a V-belt connected between two variable-diameter pulleys. A gear ratio between the two pulleys can be manipulated by adjusting the separation between two sheaves comprising each of the pulleys. Since the distance between the two pulleys as well as the length of the V-belt remain constant, the two pulleys must be adjusted simultaneously to maintain a suitable tension on the V-belt. The embodiments disclosed herein provide an apparatus and methods for a CVT primary clutch that provides enhanced adjustability and performance to off-road vehicle drivetrains.

FIG. 1 illustrates an exemplary embodiment of a CVT primary clutch 100 comprising a portion of a CVT 104 of an exemplary vehicle 108. The CVT primary clutch 100 is attached to an engine of vehicle 108 and joined to a V T secondary clutch 112 by way of a belt 116. The belt 116 may of a V-belt variety or any other variety of belt that is suitable for use in the CVT 104. The V T secondary clutch 112 is attached to a transmission, transaxle, or drivetrain of vehicle 108. When the engine applies a suitable torque, the CVT primary clutch 100 turns the CVT secondary clutch 112 by way of the belt 116, as described herein.

The CVT primary clutch 100 (hereinafter "clutch 100*") may be of a centrifugal clutch variety that is mounted to an output end of an engine crankshaft. The clutch 100 generally includes a fixed, stationary sheave and a moveable sheave that can be moved toward the stationary sheave to engage the belt 116. When engine speed increases, the clutch 100 pushes the moveable sheave toward the stationary sheave, thus narrowing the spacing between the stationary sheave and the moveable sheave. The narrow spacing causes the belt 116 to rotate and turn the CVT secondary clutch 112 (hereinafter "secondary clutch 112"). While at idle speeds, however, the moveable sheave is moved away from the stationary sheave, thus allowing belt 116 to sit between the stationary sheave and the moveable sheave without being driven. The spacing between the stationary sheave and the moveable sheave provides a "neutral" position that allows the engine to idle without transmitting power to the drivetrain of the vehicle 108.

Figure 2:
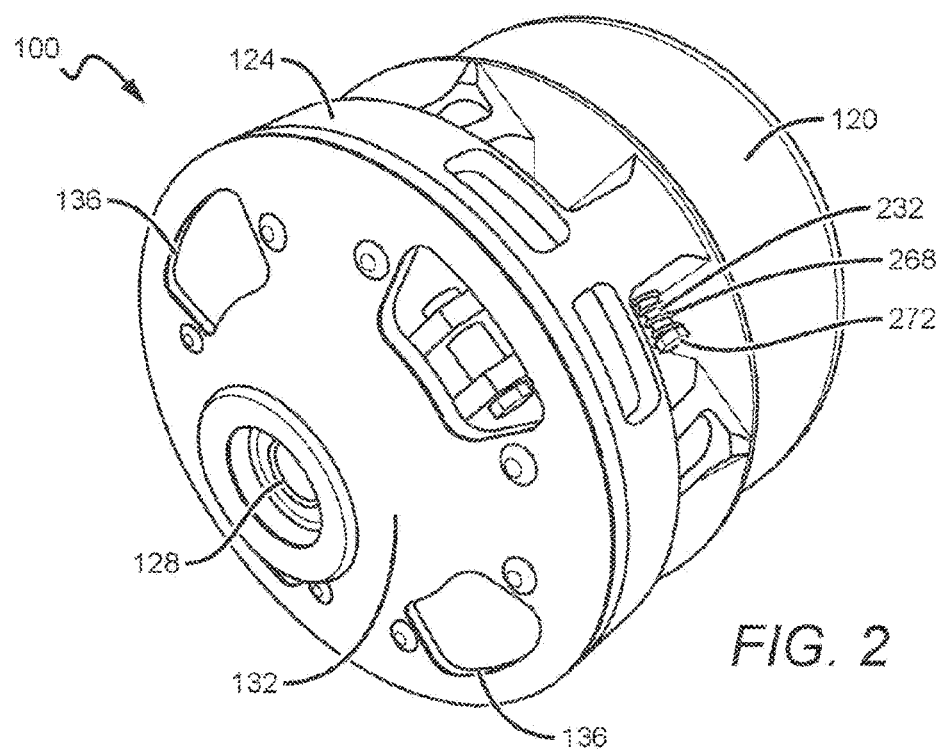
FIG. 2 illustrates a perspective view 82 of an exemplary embodiment of a primary clutch of FIG. 1.

FIG. 2 illustrates a perspective view of an exemplary embodiment of a primary clutch 100 in accordance with the present disclosure. The clutch 100 includes a stationary sheave 120 and a moveable sheave 124 that generally shares a center post 128 that operates as an axle of the clutch 100. As mentioned above, the stationary sheave 120 is configured to be mounted to an output end of an engine crankshaft. The stationary sheave 120 may be coupled to the engine crankshaft by way of the center post 128. The moveable sheave 124 is configured to move axially along the center post 128 toward and away from the stationary sheave 120 in response to engine RPM. A face plate 132 may be fastened onto the moveable sheave 124 to protect internal components as well as to add an aesthetic appeal to the clutch 100. The face plate 132 may be implemented with any of the various decorations, colors, diagrams, words, numbers, and the like, without limitation. Further, as shown in FIG. 2, the face plate 132 includes multiple openings 136 configured to provide a practitioner with easy access to internal components comprising the clutch 100. The openings 136 facilitate the practitioner quickly and easily performing adjustments to the performance of the clutch 100, as described herein.

Figure 3:
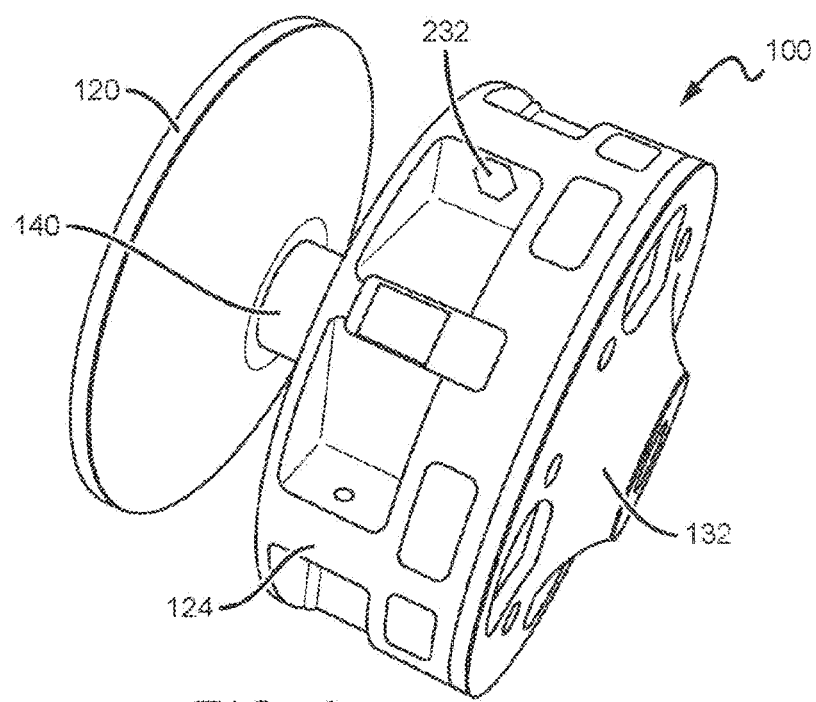
FIG. 3 illustrates an upper perspective view of the clutch of FIG. 1.
Figure 5:
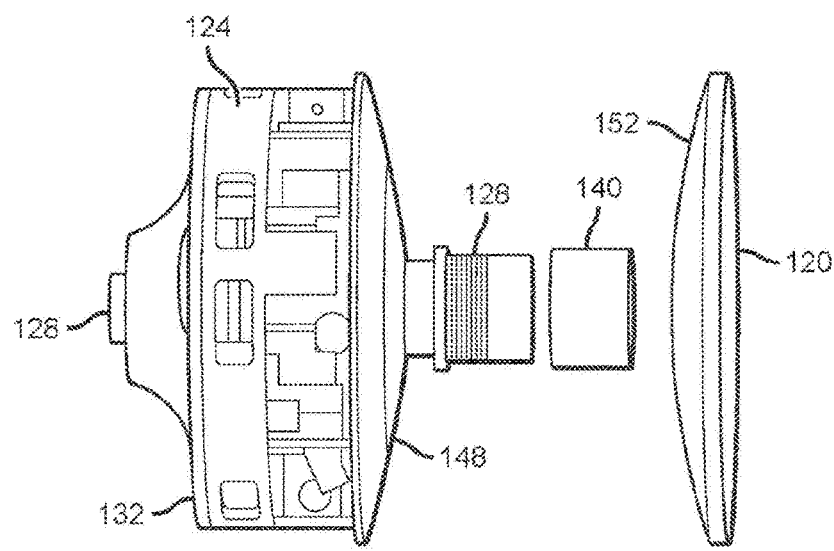
FIG. 5, illustrates a roller bearing mounted onto a center post.
Figure 6:
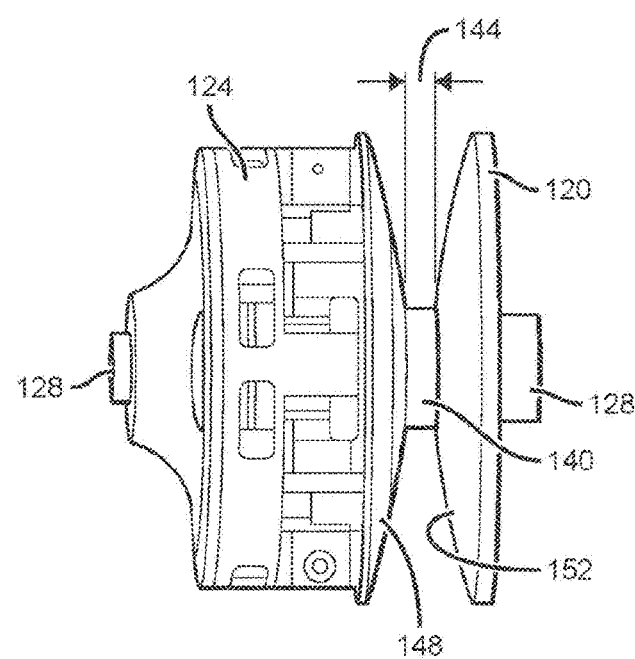
FIG. 6 illustrates a moveable sheave moving toward a stationary sheave causing a spacing to narrow between a curved surface of the moveable sheave and a curved surface of a stationary.

FIG. 3 illustrates an upper perspective view of the clutch 100 shown in FIG. 2. As shown in FIG. 3, a roller bearing 140 may be disposed between the stationary sheave 120 and the moveable sheave 124. As shown in FIG. 5, the roller bearing 140 may be mounted onto the center post 128. The roller bearing 140 is configured to provide a stationary surface for belt 116 to reside during engine idling. Experimental observations have demonstrated that the roller bearing 140 reduces belt 116 friction and overall clutch 100 temperature while increasing the longevity of belt 116. As engine RPM increases, the moveable sheave 124 will move toward the stationary sheave 120 causing a spacing 144 to narrow between a curved surface 148 of the moveable sheave 124 and a curved surface 152 of the stationary sheave 120, as shown in FIG. 6. Once the spacing 14 becomes sufficiently narrowed, the sheaves 120, 124 engage the belt 116, causing the belt 116 to ride on the curved surfaces 148, 152 and be driven by the sheaves 120, 124. The curvature of the curved surface 148 preferably matches the curvature of the curved surface 152. Direct observation has demonstrated that the matching curved surfaces 148, 152 optimize contact with belt 116 as belt tension increases and belt 116 begins to flex.

Figure 4:
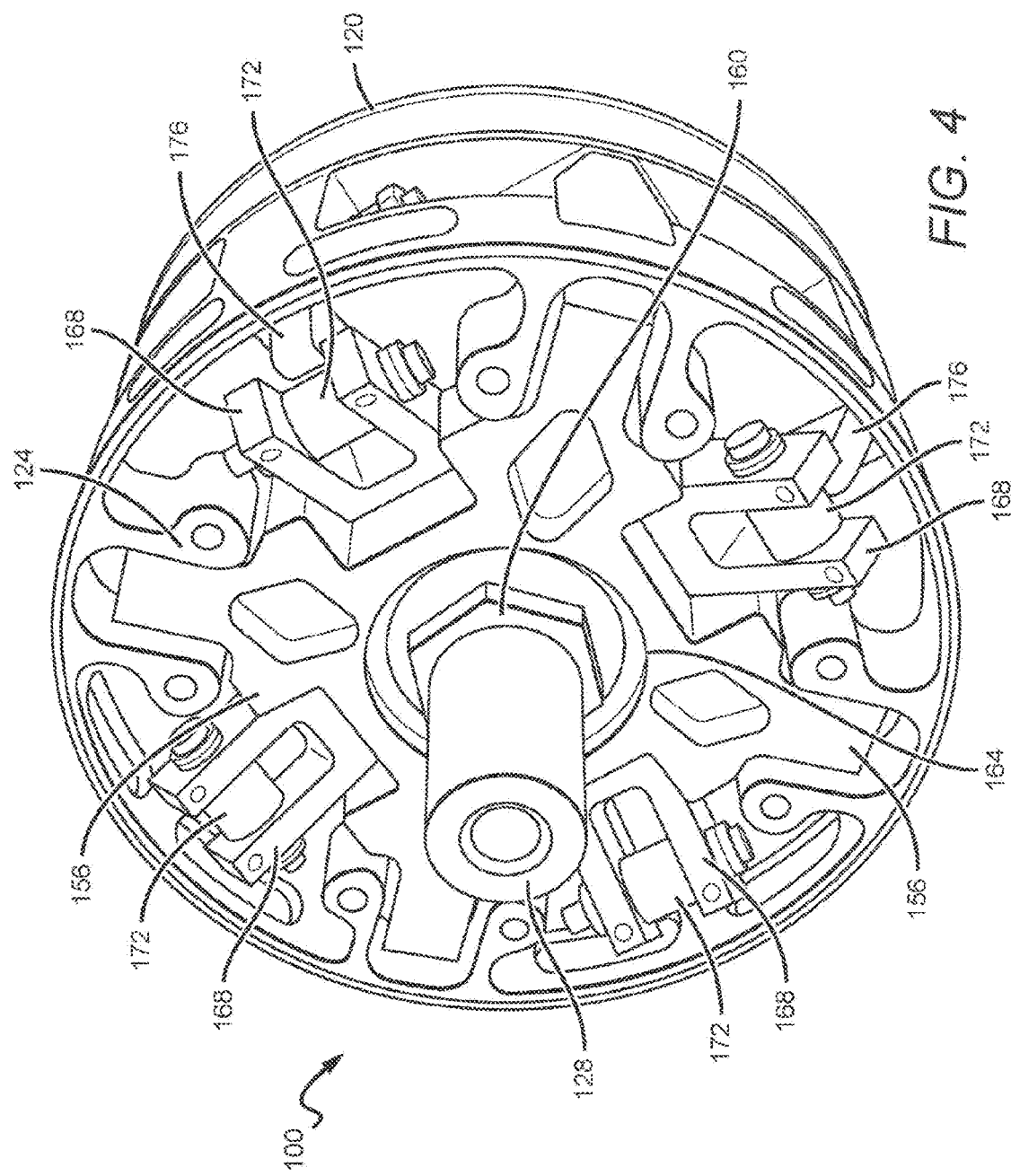
FIG. 4 illustrates a perspective view of the primary clutch of FIG. 2.

FIG. 4 illustrates a perspective view of the primary clutch 100 of FIG. 2 with the face plate 132 removed to reveal internal components comprising the clutch 100. As shown in FIG. 4, the clutch 100 includes a spider portion 156 mounted to the center post 128 by way of a ring nut 160. The spider portion 156 includes a circular groove 164 that surrounds the ring nut 160 and is configured to receive an end of a coil spring (not shown) that may be disposed between the spider portion 156 and an interior surface of the face plate 132. The coil spring serves to bias the moveable sheave 124 away from the stationary sheave 120, as described herein. The moveable sheave 124 is coupled with the spider portion 156 by way of multiple shift arms 168. Each shift arm 168 includes a roller 172 configured to ride on a ramp 176 that is coupled to the moveable sheave 124. It is contemplated that ramps 176 may comprise chromoly steel that is coated with zinc to prevent rust and provide lubricative properties to the clutch 100.

During operation, while the clutch 100 rotates, centrifugal force causes the shift arms 168 to be pushed radially outward away from the center post 128, causing the rollers 172 to push against the ramps 176. As the rate of rotation increases, the rollers 172 push on the ramps 176 with enough force to push the moveable sheave 124 toward the stationary sheave 120, as described herein. Unlike conventional clutches wherein moveable ramps engage with stationary rollers, in the present clutch 100 the rollers 172 move while the ramps 176 remain stationary with respect to the moveable sheave 124. As such, the clutch 100 includes fewer moving parts and less internal friction than conventional clutches.

Figure 7:
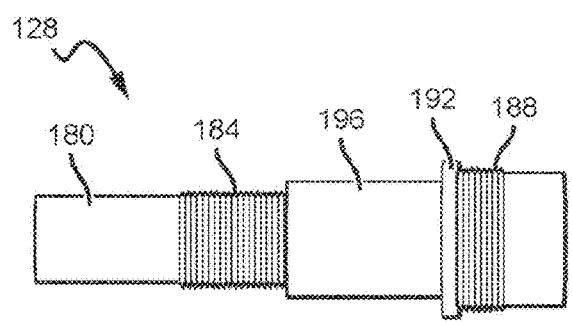
FIG. 7 illustrates an exemplary embodiment of the center post of the clutch of FIG. 1.

Turning, now, to FIG. 7, an exemplary embodiment of the center post 128 is shown. The center post 128 may be made of a suitably strong material, such as chromoly streel. Preferably, the material comprising the center post 128 has a relatively high density so as to concentrate the weight of the clutch 100 closer to the center of the clutch 100. It is contemplated that centralizing the weight creates a lower rotational inertia of the clutch 100 that allows the clutch 100 to react relatively quickly to engine speed changes and thus results in an improved throttle response as well as a more predictable acceleration.

As shown in FIG. 7, the center post 128 is a generally elongated member that includes a first smooth portion 180 configured to support the face plate 132 when the moveable sheave 124 and the face plate 132 slides toward and away from the stationary sheave 120. Further, the center post 128 includes a first threaded portion 184 configured to receive the ring nut 160 to fixate the spider portion 156 to the center post 128. A second threaded portion 188 is configured to facilitate coupling the stationary sheave 120 to the center post 128. The center post 128 includes a ring boss 192 configured to lock with the stationary sheave 120 and provide improved support to the stationary sheave 120. The center post 128 includes a second smooth portion 196 configured to support the roller bearing 140, as described herein.

Figure 8:
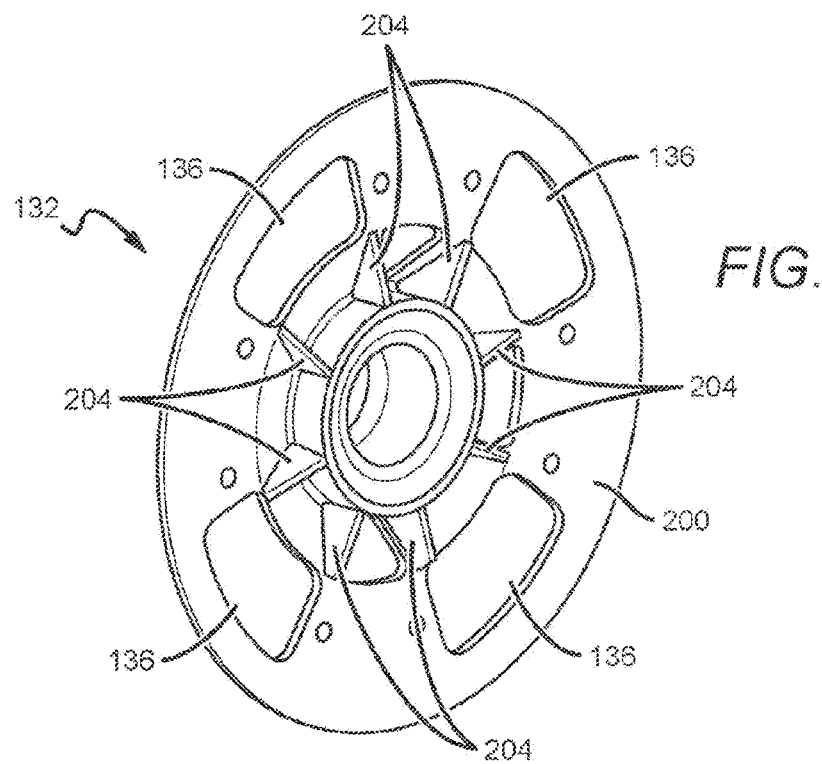
FIG. 8 illustrates an inner surface of an exemplary embodiment of a face plate of the clutch of FIG. 1.

FIG. 8 illustrates an inner surface 200 of an exemplary embodiment of a face plate 132 that may be fastened onto the moveable sheave 124 to protect internal components as well as to add an aesthetic appeal to the clutch 100. As mentioned hereinabove, the face plate 132 may be implemented with any of various decorations, colors, diagrams, words, numbers, and the like, without limitation. Further, the face plate 132 includes multiple openings 136 to provide easy access to the internal components of the clutch 100. The openings 136 facilitate the practitioner quickly and easily performing adjustments to the performance of the clutch 100, as described herein. As shown in FIG. 8, multiple fan blades 204 may be disposed on the inner surface 200 and configured to provide cooling to the components comprising the clutch 100.

Figure 9:
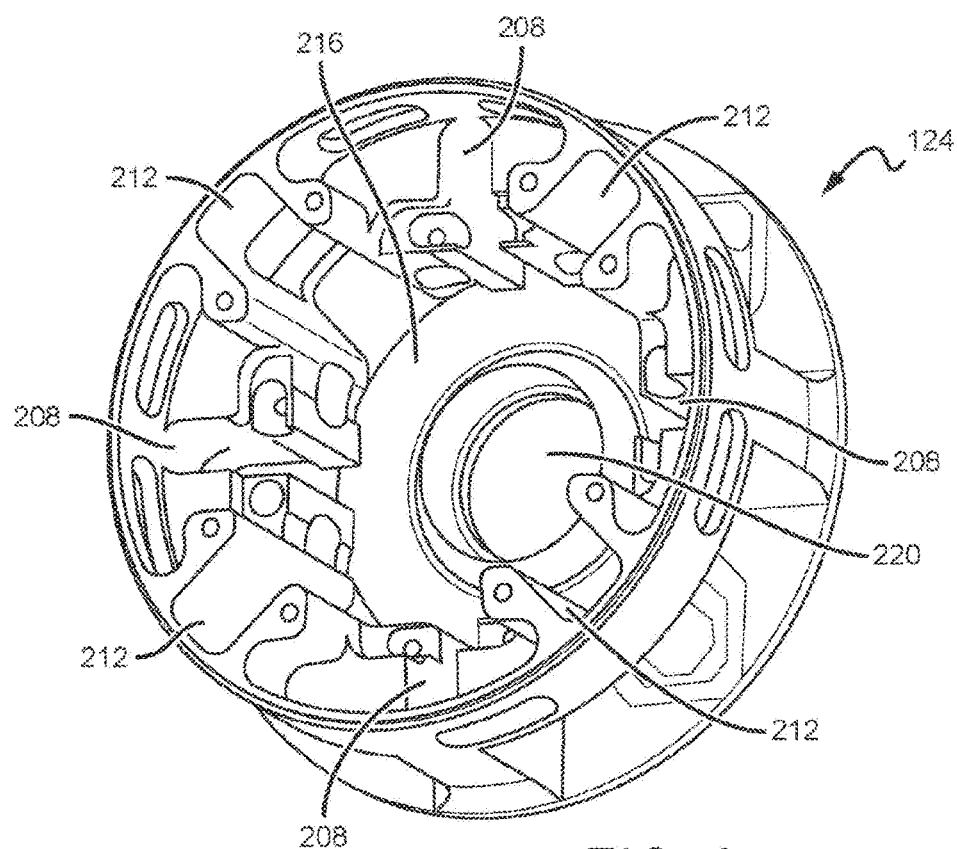
FIG. 9 illustrates an interior of an exemplary embodiment of a moveable sheave incorporated into a primary clutch.

FIG. 9 illustrates an interior of an exemplary embodiment of a moveable sheave 124 that may be incorporated into the primary clutch 100 in accordance with the present disclosure. The moveable sheave 124 generally is configured to maximize structural integrity and heat dissipation. In the embodiment shown in FIG. 9, the moveable sheave 124 includes recesses 208 that are configured to receive the ramps 176. The recesses 208 are disposed in pairs on opposite sides of the moveable sheave 124 so as to balance the clutch 100 during operation. Further, the moveable sheave 124 includes recesses 212 disposed in pairs on opposite sides of an interior space 216 of the moveable sheave 124. The recesses 212 and the interior space 216 are configured to accommodate the spider portion 156 described hereinabove. A center bore 220 comprising the moveable sheave 124 is configured to receive the second smooth portion 196 of the center post 128, as described with respect to FIG. 7. In some embodiments, the center bore 220 may be configured to accommodate the roller bearing 140 installed onto the second smooth portion 196 of the center post 128, as described with respect to FIGS. 5-7.

Figure 10:
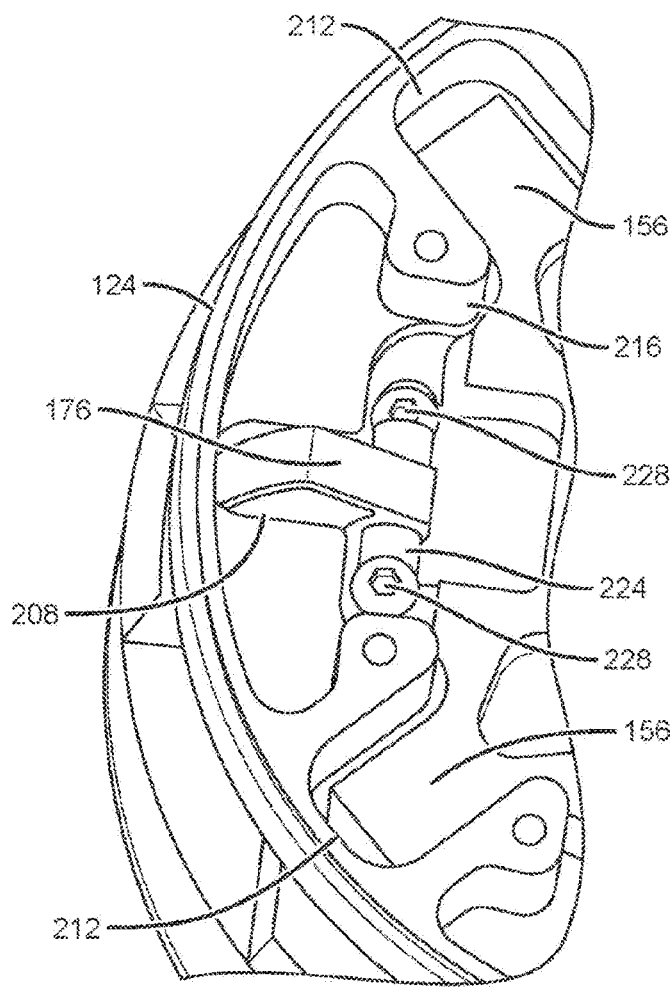
FIG. 10 illustrates a close-up view of the moveable sheave of FIG. 9 coupled with a spider portion and a ramp.

FIG. 10 illustrates a close-up view of the moveable sheave 124 of FIG. 9 coupled with a spider portion 156 and a ramp 176. As shown in FIG. 10, the spider portion 156 is slidably retained within the interior space 216 and recesses 212 of the moveable sheave 124. The ramp 176 is disposed within recess 208 and coupled to the moveable sheave 124 by way of a pivot 224 and fasteners 228. The pivot 224 is configured to allow ramp 176 to be rotated with respect to recess 208. Free rotation of ramp 176 is prevented by a quick shift bolt 232 (see FIGS. 12-14) that is mounted within the moveable sheave 124 below ramp 176. As discussed in greater detail hereinbelow, the quick shift bolt 232 is configured to provide an adjustable means for positioning the ramp 176 with respect to the moveable sheave 124, whereby the practitioner may adjust the performance of the clutch 100, as desired.

Figure 11:
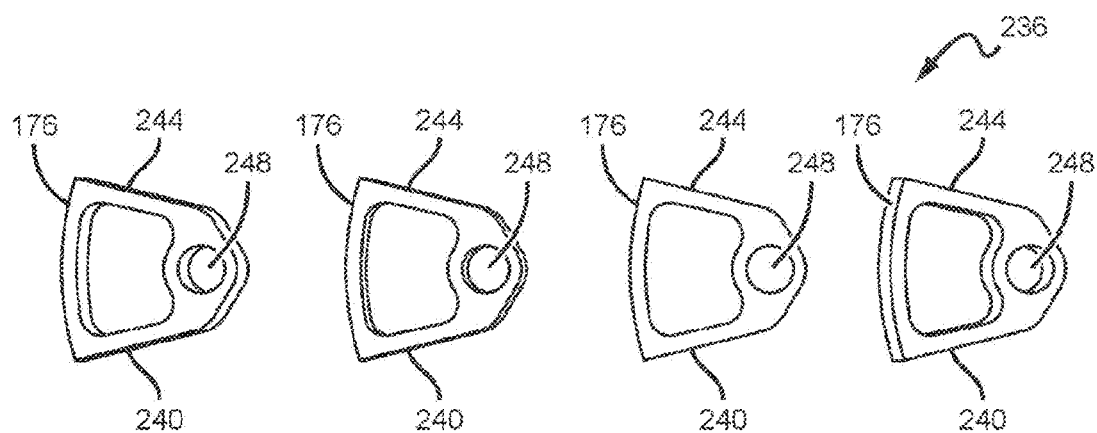
FIG. 11 illustrates an exemplary embodiment of a ramp set that may be incorporated into the clutch of FIG. 1.

FIG. 11 illustrates an exemplary embodiment of a ramp set 236 that may be incorporated into the clutch 100 according to the present disclosure. The ramp set 236 comprises an even number of similarly configured ramps 176. Preferably, ramp set 236 comprises four substantially identical ramps 176 such that the clutch 100 remains balanced during rotation. As shown in FIG. 1, each of the ramps 176 includes a first side 240, which may be labeled "A," and a second side 244, which may be labeled "B," and an opening 248. The opening 248 is configured to receive the pivot 224 and allows the disposition, or angle, of ramp 176 within the recess 208 to be adjusted. The first and second sides 240, 244 are configured to accept the rollers 172 of the shift arms 168, described with respect to FIG. 4 Thus, installing the amp 176 in a position "A" places the first side 240 in a position to accept the roller 172, while installing the ramp 176 in a position "B" places the second side 244 in a position to accept the roller 172.

In general, the ramps 176 are adapted to enable the practitioner to select either the first side 240 or the second side 244 to contact the roller 172. The openings 136 in the face plate 132 (see FIG. 2) are configured to provide easy access to the ramps 176 without necessitating the disassembly of the clutch 100. As such, the practitioner may work through the opening 136 to remove the fasteners 228 (see FIG. 10), flip the ramp 176 from position "A" to position "B," and then reinstall the fasteners 228. Flipping the ramps 176 from position "A" to position "B" increases belt 116 engagement and lowers the engine RPM at which the sheaves 120, 124 begin to drive the belt 116. The ramps 176 may be flipped in opposing pairs to maintain a balanced rotational inertia of the clutch 100. As such, the ramps 176 may be flipped according to three ramp profiles: all ramps 176 in position "A;" two ramps 176 in position "A" and two ramps 176 in position "B;" or all ramps 176 in position "B."

Figure 12:
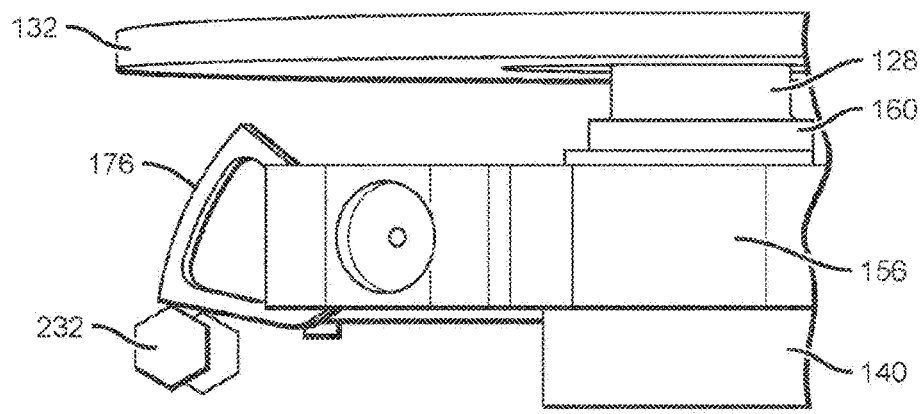
FIG. 12 illustrates a relationship between a ramp and a quick shift bolt in absence of a moveable sheave.
Figure 13:
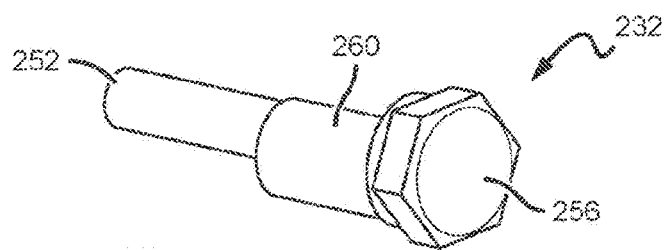
FIG. 13 illustrates a quick shift bolt that includes a threaded portion and a hexagonal head that share an intervening cam.
Figure 14:
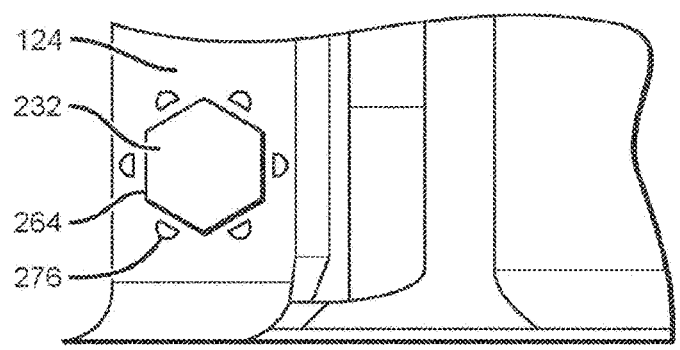
FIG. 14 illustrates a quick shift bolt turned to six unique positions.

FIG. 12 illustrates a relationship between a ramp 176 and a quick shift bolt 232 in absence of moveable sheave 124. The quick shift bolt 232 is configured to support the ramp 176 at a selected ramp angle with respect to the roller 172 (see FIG. 4). As best shown in FIG. 13, the quick shift bolt 232 includes a threaded portion 252 and a hexagonal head 256 that share an intervening cam 260. The hexagonal head 256 is configured to lock the quick shift bolt 232 within a hexagonal hole 264 disposed in the moveable sheave 124, as shown in FIG. 14. The threaded portion 252 is configured to receive a spring 268 and a nut 272, as shown in FIG. 2. As will be appreciated, the spring 268 biases the quick shift bolt 232 toward the moveable sheave 124 and thus keeps the hexagonal head 256 disposed in the hexagonal hole 264 as shown in FIG. 14.

The hexagonal hole 264 generally orients the quick shift bolt 232 in the moveable sheave 124 such that the cam 260 is in contact with the ramp 176, as shown in FIG. 12. As shown in FIG. 13, the cam 260 is offset from the longitudinal axis of the quick shift bolt 232, such that turning the quick shift bolt 232 causes the cam 260 to alter the ramp angle of the ramp 176 with respect to the roller 172 (see FIG. 4). As will be appreciated, the quick shift bolt 232 may be turned to six unique positions 276 (see FIG. 14) within the hexagonal hole 264 causing the ramp 176 to assume six unique ramp angles. Adjusting the quick shift bolt 232 to higher settings increases belt 116 engagement and lowers the engine RPM at which the sheaves 120, 124 begin to drive the belt 116. In the illustrated embodiment, the clutch 100 includes four quick shift bolts 232 that offer the following 21 different combinations of quick shift bolt 232 settings:

| 1:1 | 1:2 | 1:3 | 1:4 | 1:5 | 1:6 |
|---|---|---|---|---|---|
|  | 2:2 | 2:3 | 2:4 | 2:5 | 2:6 |
|  |  | 3:3 | 3:4 | 3:5 | 3:6 |
|  |  |  | 4:4 | 4:5 | 4:6 |
|  |  |  |  | 5:5 | 5:6 |
|  |  |  |  |  | 6:6 |

It should be understood that the four quick shift bolts 232 in combination with the above-discussed three ramp profiles provide 63 unique tuning options without requiring the practitioner to add additional weight to the clutch 100, unlike conventional clutches.

Figure 15:
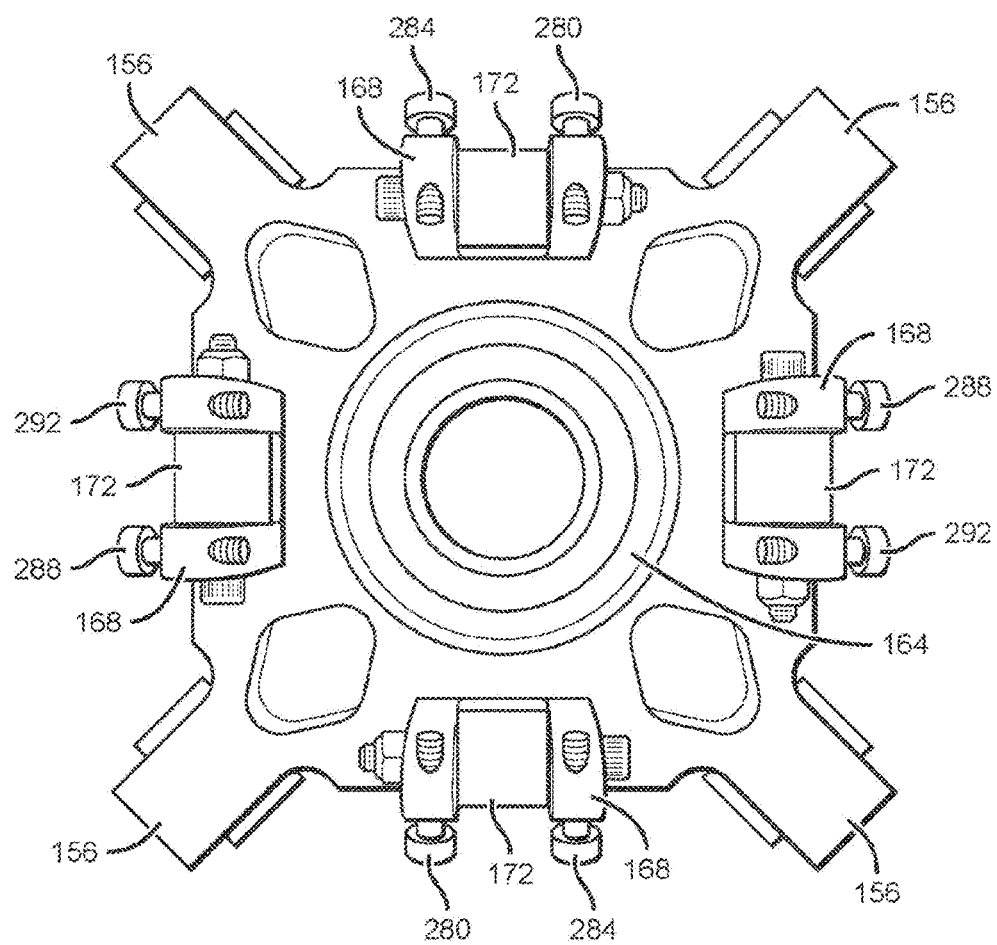
FIG. 15 illustrates an exemplary embodiment of a spider portion that includes shift arms and rollers.

In some embodiments, additional weight may be added to the clutch 100 to affect belt 116 engagement and the engine RPM at which the sheaves 120, 124 begin to drive the belt 116. For example, FIG. 15 illustrates an exemplary embodiment of a spider portion 156 that includes shift arms 168 and rollers 172 that may be incorporated into the clutch 100, according to the present disclosure. As shown in FIG. 15, additional weight in the form of bolts may be added to the shift arms 168 to decrease the engine RPM at which the clutch 100 begins to drive the belt 116. The additional weights must be added in opposing pairs to maintain a balanced rotational inertia of the clutch 100. For example, a first bolt pair 280 may be added to opposing shift arms 168 to achieve a first weight setting. A second weight setting may be obtained by adding a second bolt pair 284 to opposing shift arms 168 in addition to the first bolt pair 280. A third weight setting can be obtained by adding a third bolt pair 288 in addition to the first and second bolt pairs 280, 284. Further, adding a fourth bolt pair 292 to opposing shift arms 168 in addition to the previous bolt pairs 280, 284, and 288 gives rise to a fourth weight setting. And, removing all the bolt pairs 280, 284, 288, 292 provides a fifth weight setting.

Figures 16, 17:
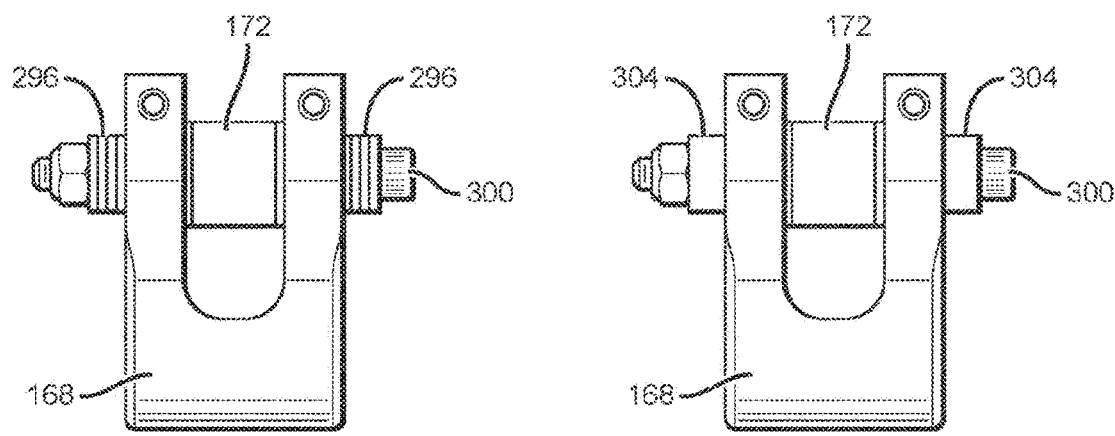
FIG. 16 illustrates washer weights added to shift arms.
FIG. 17 illustrates roller weights added to shift arms.

In some embodiments, washer weights and roller weights may be added to the shift arms 168, as shown in FIGS. 16-17, to decrease the engine RPM at which the clutch 100 begins to drive the belt 116. FIG. 16 illustrates an exemplary embodiment of a shift arm 168 that includes multiple washer weights 296 installed onto a thru bolt 300 that supports a roller 172. In the illustrated embodiment, four washer weights 296 are mounted onto opposite sides of the shift arm 168. In some embodiments, however, more or less than four washer weights 296 may be added to the shift arm 168 so long as the washer weights 296 are added in pairs to opposing sides of the shift arms 168. FIG. 17 illustrates an exemplary embodiment of a shift arm 168 that includes roller weights 304 installed onto a thru bolt 300 that supports a roller 172. As will be appreciated, the roller weights 304 preferably are installed in a pair onto opposing sides of the shift arm 168.

Moreover, in some embodiments, the performance of the clutch 100 may be adjusted by replacing the rollers 172 with different size rollers. For example, in one embodiment, the rollers 172 may include a standard size, a 1 mm oversize, and a 2 mm oversize. Experimental observations have demonstrated that oversized rollers 172 cause the moveable sheave 124 to move more quickly toward the stationary sheave 120, giving rise to a lower full shift RPM. It is contemplated that the quicker shifting of the clutch 100 is due to the weight of the oversize roller 172 as well as a greater angle between the shift arm 168 and the ramp 176 due to the diameter of the oversize roller 172. As with all of the above-mentioned adjustments, the oversize rollers 172 must be added in opposing pairs to maintain a balanced rotational inertia of the clutch 100.

While the invention has been described in terms of particular variations and illustrative figures, those of ordinary skill in the art will recognize that the invention is not limited to the variations or figures described. In addition, where methods and steps described above indicate certain events occurring in a certain order, those of ordinary skill in the art will recognize that the ordering of certain steps may be modified and that such modifications are in accordance with the variations of the invention. Additionally, certain of the steps may be performed concurrently in a parallel process, when possible, as well as performed sequentially as described above. To the extent there are variations of the invention, which are within the spirit of the disclosure or equivalent to the inventions found in the claims, it is the intent that this patent will cover those variations as well. Therefore, the present disclosure is to be understood as not limited by the specific embodiments described herein, but only by the scope of the appended claims.

Figure 18:
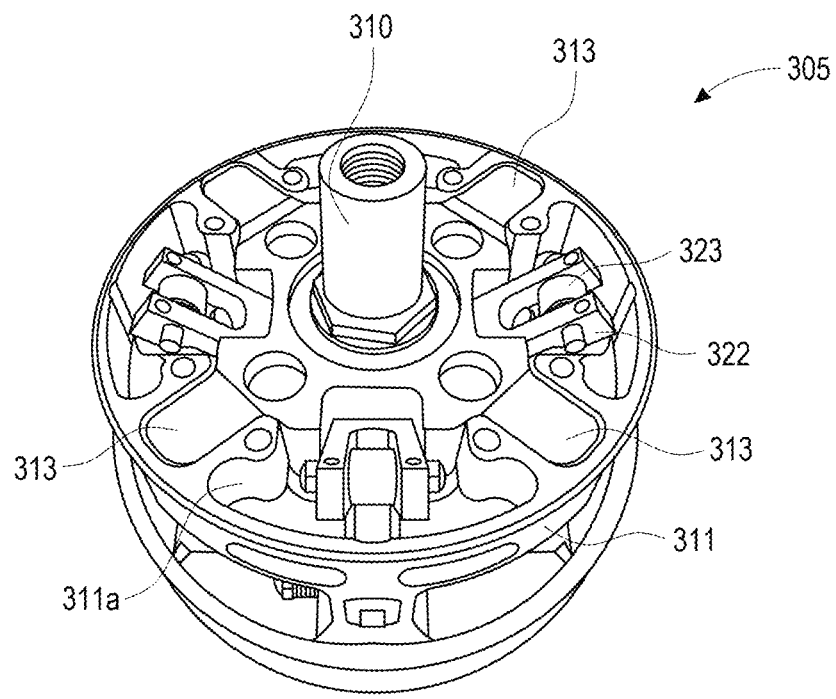
FIG. 18 is a perspective view showing a CVT primary clutch that incorporates a spider assembly roller system of the present invention.
Figure 19:
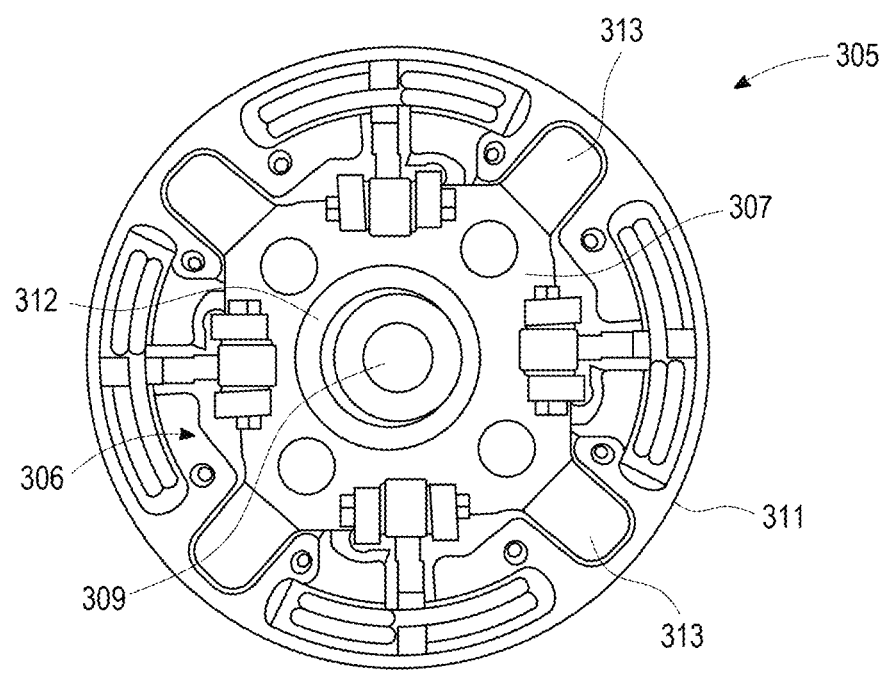
FIG. 19 is a top view of the CVT primary clutch of FIG. 18.
Figure 20:
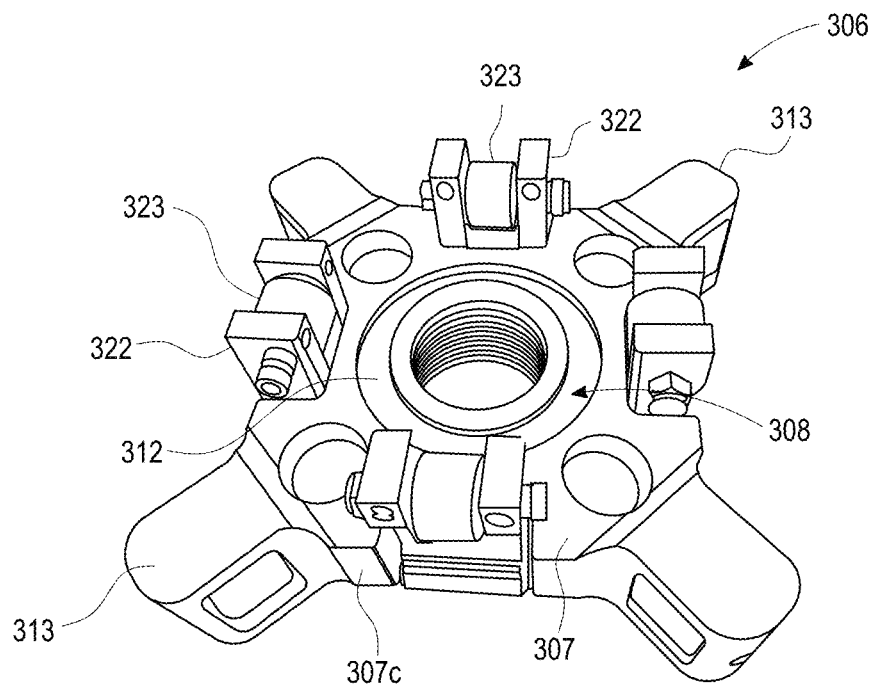
FIG. 20 is a perspective stand-alone view of the spider assembly roller system of FIG. 18.
Figure 21:
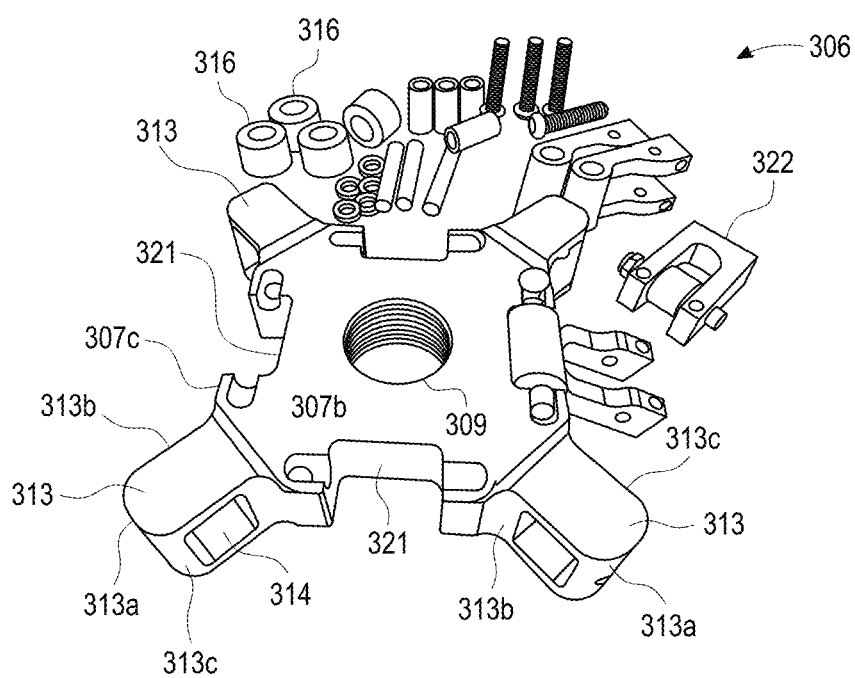
FIG. 21 is a disassembled view showing all of the general components of the spider assembly roller system FIG. 18.

Referring to FIGS. 18-23, FIG. 18 is a perspective view and FIG. 19 is a top view showing a CVT primary clutch 305 that incorporates an embodiment of a spider assembly roller system 306 of the present invention. FIG. 20 is a perspective stand-alone view of the spider assembly roller system 306 of FIG. 18. FIG. 21 is a disassembled view showing all of the general components of the spider assembly roller system 306 of FIG. 18.

In general, when the continuous variable transmission comes to transfer of power through the belt, the centrifugal weights squeeze the primary clutch together with RPM and as a moveable on most clutches, have spiders with buttons such as the spider portion 156 shown in FIG. 14, transferring engine torque through the belt. The spider assembly roller system 306 of FIGS. 18-23 replaces the button system of previous spiders with a roller-based component that includes but is not limited to rollers and a collar that runs through the roller to improve performance. It has been discovered that replacing the button system of previous spiders with a roller-based component provides for instant power delivery due to the reduction in friction between the spider and movable sheave. This results in improved belt grip than before, lower belt temps, better belt life, and buttery smooth engagement that's guaranteed to keep your car dialed in any riding condition.

The spider assembly roller system 306 may be manufactured with Computer numerical control (CNC) precision and comprises components made with specially machined radii for high efficiency and low wear. With the high centrifugal forces produced in the clutch, the spider assembly roller system 306 allows for a higher efficiency of power with less heat and more responsiveness. The spider assembly roller system 306 is also distinctive in design with the use of materials, coatings, and precision-engineered tolerances which provides the spider assembly roller system 306 of the present invention with improved functional characteristics compared to the prior art.

The spider assembly roller system 306 includes a spider portion main body 307 preferably made from an anodized and non-conductive material and having a first face 307*a*, a second face 307*b*, a side wall 307*c*, and a center portion 308 with a spider main orifice 309 extending through the main body 307 with the center portion 308 configured to mount the main body 307 onto a center post 310 within an interior 311*a* of a moveable sheave 311 of the CVT primary clutch 305.

Located on the first face 307*a* of the main body 307 proximal to the center portion 308 is a circular groove 312 configured to receive an end of a coil spring disposed between the main body 307 and an interior surface 200 of the face plate 132.

In the embodiment of FIGS. 18-21, the main body 307 is shown including four main body arms 313 extending equal distance from the sidewall 307*c* of the main body 307 in a direction perpendicular to a central axis of the spider main orifice 309 of the center portion 308.

Figure 22:
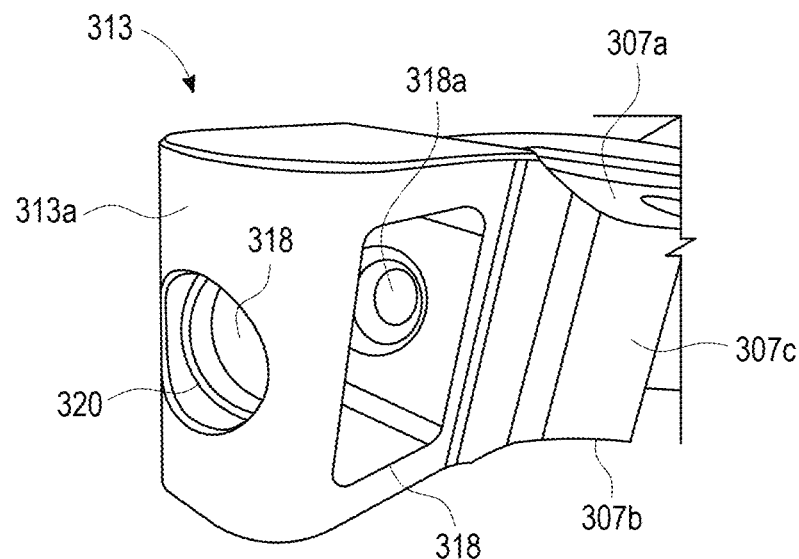
FIG. 22 is a close-up perspective view showing the spider assembly roller system of FIG. 18.
Figure 23:
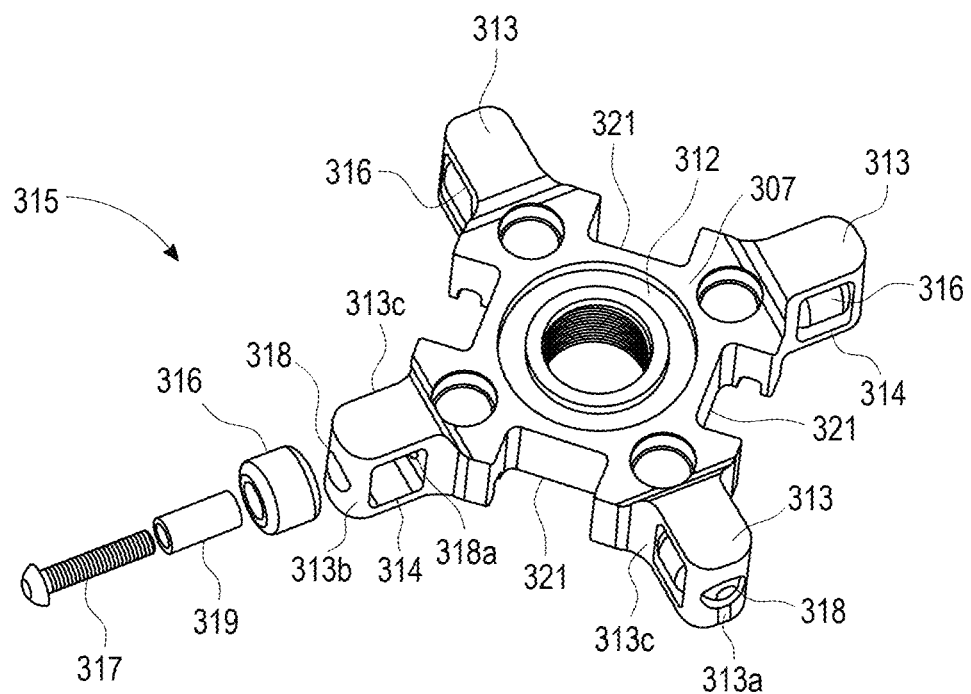
FIG. 23 is a blow-apart view showing the individual components that make up each of the spider roller assembly of the spider assembly roller system of FIG. 18.

FIG. 22 is a close-up perspective view showing the spider roller arms 313 of the spider assembly roller system 306 of FIG. 18 with the spider main body 307 designed to support a spider roller assembly 315 therein. FIG. 23 is a blow-apart view showing the individual components that make up each of the spider roller assembly 315 of the spider assembly roller system 306 of FIG. 18.

Each of the main body arms 313 includes a free end 313*a*, first side 313*b*, a second side 313*c*, and a roller supporting orifice 314 extending from the first side 313*b* to the second side 313*c* of the main body arm 313.

As shown in FIGS. 22 and 23, each of the main body arms 313 also includes a first bolt receiving slot 318 extending from the free end 313*a* of the main body arms 313 into the roller supporting orifice 314 and aligned with a corresponding second bolt receiving slot 318*a* located on the main body.

The first and second bolt receiving slots 318 and 318*a* function to support the mounted of a spider roller 316 to the roller supporting orifice 314 by a precision machined stainless steel roller collar 319 located between the spider roller 316 and the roller mounting bolt 317. The preferred use of a stainless material eliminates corrosive deterioration and is non-conductive with no magnetic properties which means it does not pick up dirt, dust, or static. The roller collar 319 is preferably recessed into either end of the main body arms 313, which encapsulates roller collar 319 fully for rigid support thereby increasing the strength of the roller collar 319 exponentially.

The spider roller 316 is preferably made from a material having high resistance to wear and increased thermal stability such as but not limited to a hardened plastic preferably capable of handling over 500 horsepower and allows for very high efficiency of the CVT system with cooler running temperatures.

Referring to FIG. 22, the free end 313a of the main body arms 313 is shown each having an indented ridge 320 to provide the flush mounting of a roller mounting bolt 317 to the main body arm 307. This functions to hold spider roller 316 with the roller collar 319 precisely in place.

A feature of the present invention is that when to the spider arm 313 by roller collar 319 and roller mounting bolt 317, the spider roller 316 is supported partially within the spider roller supporting orifice 314 with a moveable sheave engaging exterior rotating surface extending partially outward equal distance from each of the sides 313b and 313c of the main body arm 313 to provide smooth back and forth movement of the moveable sheave 311.

A feature of the present invention is that the spider assembly roller system 306 is also designed with a special clearance for a smooth running and low maintenance assembly. It is noted that with the help of today's very precise CNC machines, the spider assembly roller system 306 was able to tune in the accuracy of machining to allow the spider assembly roller system 306 to work both ways with approximately 0.003" side clearance.

As such, with the spider assembly roller system 306, the user can keep the same tight clearance but have a much smoother operating clutch, resulting in smoothness in performance of the clutch, improved belt life, reduction in belt heat, improved clutch responsiveness resulting in a new improved level of performance on clutch performance Similar to the embodiment of FIGS. 15-17, the spider portion main body 307 of the spider assembly roller system 306 of FIGS. 1-23 is also shown including a shift arm supporting recess 321 located on the sidewalls 307c of the spider portion main body 307 equal distance between each of the spider arms 313. The shift arm supporting recess 321 each supporting a shift arm 322 having a roller 323 configured to ride on a ramp coupled to a moveable sheave 311.

I claim:

1. A CVT primary clutch spider assembly roller system comprising:
    a spider portion main body having a first face, a second face, a side wall, and a center portion with a spider main orifice extending through the main body with the center portion configured to mount the main body onto a center post within an interior of a moveable sheave of a CVT primary clutch;
    a plurality of main body arms extending equal distance from the sidewall of the main body in a direction perpendicular to a central axis of the spider main orifice of the center portion, each of the main body arms having a free end, first side, a second side, and a roller supporting orifice extending from the first side to the second side of the main body arm;
    a first bolt receiving slot extending from the free end of the main body arms into the roller supporting orifice and a second bolt receiving slot located on the main body and aligned with the first bolt receiving slot;
    a spider roller supported partially within the spider roller supporting orifice, the spider roller including a moveable sheave engaging exterior rotating surface extending partially outward equal distance from each of the sides of the main body arm to provide smooth back and forth movement of the moveable sheave; and
    a shift arm supporting recess located on the sidewall equal distance between each of the arms of the main body.

2. The CVT primary clutch spider assembly roller system of claim 1 wherein the plurality of main body arms comprises four main body arms extending equal distance from the sidewall of the main body in a direction perpendicular to the central axis of the spider main orifice of the center portion.

3. The CVT primary clutch spider assembly roller system of claim 1 including a circular groove located on the first face of the main body proximal to the center portion and configured to receive an end of a coil spring disposed between the main body and an interior surface of a face plate.

4. The CVT primary clutch spider assembly roller system of claim 1 wherein the spider portion main body is made from an anodized and non-conductive material.

5. The CVT primary clutch spider assembly roller system of claim 1 wherein the roller is mounted to the roller supporting orifice by a roller collar located between the spider roller and a roller mounting bolt.

6. The CVT primary clutch spider assembly roller system of claim 1 wherein the free end of the main body arms each includes an indented ridge to provide the flush mounting of a roller mounting bolt to the main body arm.

7. The CVT primary clutch spider assembly roller system of claim 1 wherein the shift arm supporting recess each supporting a shift arm having a roller configured to ride on a ramp coupled to a moveable sheave.

8. The CVT primary clutch spider assembly roller system of claim 1 wherein the spider rollers are made from a hardened plastic handling over 500 horsepower.

9. The CVT primary clutch spider assembly roller system of claim 5 wherein the spider collar is made from precision machined stainless steel.

10. A CVT primary clutch spider assembly roller system comprising:
    a spider portion main body having a first face, a second face, a side wall, and a center portion with a spider main orifice extending through the main body with the center portion configured to mount the main body onto a center post within an interior of a moveable sheave of a CVT primary clutch;
    a plurality of main body arms extending equal distance from the sidewall of the main body in a direction perpendicular to a central axis of the spider main orifice of the center portion, each of the main body arms having a free end, first side, a second side, and a roller supporting orifice extending from the first side to the second side of the main body arm, the free end of the main body arms each having an indented ridge to provide the flush mounting of a roller mounting bolt to the main body arm;
    a first bolt receiving slot extending from the free end of the main body arms into the roller supporting orifice and a second bolt receiving slot located on the main body and aligned with the first bolt receiving slot;

a spider roller mounted to the roller supporting orifice by a precision machined stainless steel roller collar located between the spider roller and a roller mounting bolt, the spider roller supported partially within the spider roller supporting orifice, the spider roller including a moveable sheave engaging exterior rotating surface extending partially outward equal distance from each of the sides of the main body arm to provide smooth back and forth movement of the moveable sheave; and a shift arm supporting recess located on the sidewall equal distance between each of the arms of the main body.

11. The CVT primary clutch spider assembly roller system of claim 10 wherein the plurality of main body arms comprises four main body arms extending equal distance from the sidewall of the main body in a direction perpendicular to the central axis of the spider main orifice of the center portion.

12. The CVT primary clutch spider assembly roller system of claim 11 including a circular groove located on the first face of the main body proximal to the center portion and configured to receive an end of a coil spring disposed between the main body and an interior surface of a face plate.

13. The CVT primary clutch spider assembly roller system of claim 12 wherein the shift arm supporting recess each supporting a shift arm having a roller configured to ride on a ramp coupled to a moveable sheave.

14. The CVT primary clutch spider assembly roller system of claim 13 wherein the spider portion main body is made from an anodized and non-conductive material.

15. The CVT primary clutch spider assembly roller system of claim 14 wherein the spider rollers are made from a hardened plastic handling over 500 horsepower.

16. A CVT primary clutch spider assembly roller system comprising:

a spider portion main body having a first face, a second face, a side wall, and a center portion with a spider main orifice extending through the main body with the center portion configured to mount the main body onto a center post within an interior of a moveable sheave of a CVT primary clutch;

a circular groove located on the first face of the main body proximal to the center portion and configured to receive an end of a coil spring disposed between the main body and an interior surface of a face plate;

four main body arms extending equal distance from the sidewall of the main body in a direction perpendicular to a central axis of the spider main orifice of the center portion, each of the main body arms having a free end, first side, a second side, and a roller supporting orifice extending from the first side to the second side of the main body arm, the free end of the main body arms each having an indented ridge to provide the flush mounting of a roller mounting bolt to the main body arm;

a first bolt receiving slot extending from the free end of the main body arms into the roller supporting orifice and a second bolt receiving slot located on the main body and aligned with the first bolt receiving slot;

a spider roller mounted to the roller supporting orifice by a precision machined stainless steel roller collar located between the spider roller and a roller mounting bolt, the spider roller supported partially within the spider roller supporting orifice, the spider roller including a moveable sheave engaging exterior rotating surface extending partially outward equal distance from each of the sides of the main body arm to provide smooth back and forth movement of the moveable sheave; and a shift arm supporting recess located on the sidewall equal distance between each of the arms of the main body, the shift arm supporting recess each supporting a shift arm having a roller configured to ride on a ramp coupled to a moveable sheave.

17. The CVT primary clutch spider assembly roller system of claim 16 wherein the spider portion main body is made from an anodized and non-conductive material.

18. The CVT primary clutch spider assembly roller system of claim 17 wherein the spider rollers are made from a hardened plastic handling over 500 horsepower.

* * * * *